Feb. 19, 1929.

J. R. BETZER

HEADLIGHT

Filed May 11, 1928

1,702,960

Inventor

John R. Betzer

By C. A. Snow & Co.

Attorneys

Patented Feb. 19, 1929.

1,702,960

UNITED STATES PATENT OFFICE.

JOHN R. BETZER, OF HILLSBORO, OREGON.

HEADLIGHT.

Application filed May 11, 1928. Serial No. 276,927.

This invention has reference to headlights for motor vehicles, and aims to provide a novel form of headlight so constructed that the road surface directly in front of the vehicle will be properly illuminated to facilitate driving.

An important object of the invention is to provide a headlight of this character including an elongated body portion so constructed that it will be supported on a slight incline to direct the light rays downwardly, and at the same time spread the light rays over the ground surface.

A still further object of the invention is to provide a reflector of a length to extend from the lens of the light to a point adjacent to the lamp supported at the rear of the lamp, so that the light rays will be directed downwardly.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
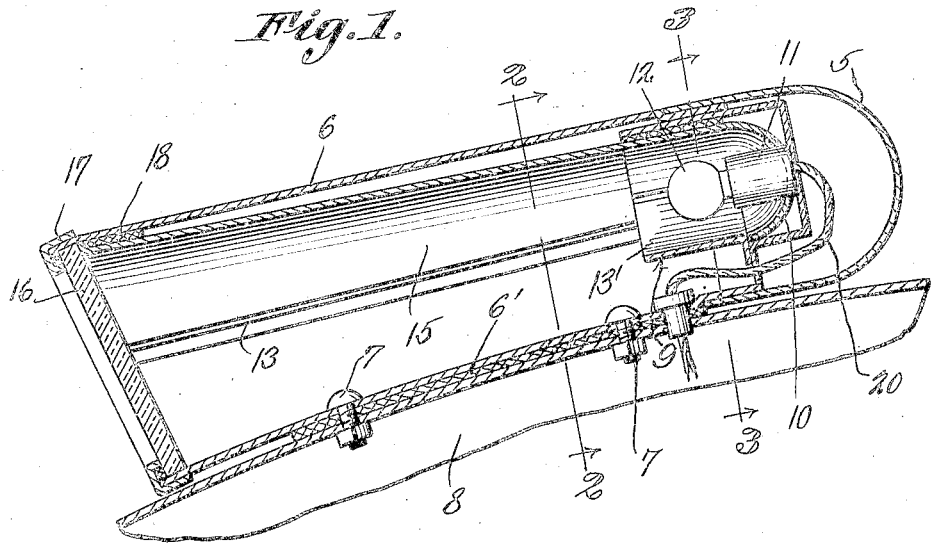
Figure 1 is a longitudinal sectional view through a headlight constructed in accordance with the invention.
Figure 2:
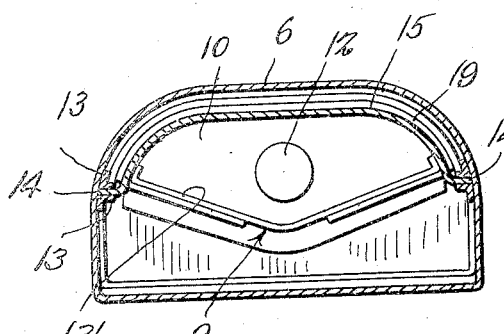
Figure 2 is a sectional view taken on line 2—2 of Figure 1.
Figure 3:
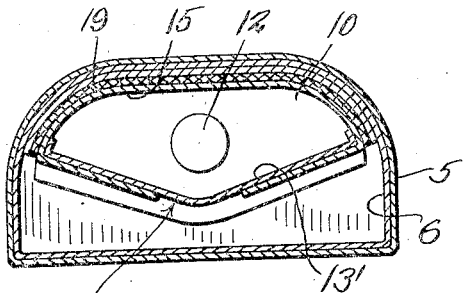
Figure 3 is a sectional view taken on line 3—3 of Figure 1.

Referring to the drawing in detail, the light forming the essence of the present invention, is especially designed to be supported on fenders or mud guards of motor vehicles, and as shown the headlight includes a rear portion 5 and a body portion 6, which is wider at the outer end than at the rear thereof, the body portion being elongated and provided with a reduced end fitted in the rear portion 5 to secure the body portion to the rear portion.

The headlight rests on a paper or felt gasket 6' and is secured to the fender or mud guard by means of the bolts 7, the mud guard or fender in the present showing being indicated by the reference character 8. Supported at the rear of the body portion 6 is a lamp housing 9 which includes a rear wall 10 curved to provide a reflector and formed with an opening for the reception of the lamp socket 11, in which the lamp 12 is mounted. The bottom 13' of the lamp housing slopes slightly downwardly from the sides thereof, the same being formed of reflecting material to direct light rays upwardly onto the main reflector to be hereinafter more fully described.

Extending throughout the length of the body portion 6 and disposed at points intermediate the upper and lower edges of the body portion 6, are supporting flanges 13, between which the lateral flanges 14 of the reflector 15 are positioned, to the end that the reflector may be readily removed for the purpose of cleaning or repairing the light.

The lens of the headlight is indicated by the reference character 16 and is supported at an oblique angle with respect to the upper and lower edges of the body portion so that light rays will be directed downwardly below the line of vision of an approaching motor vehicle.

The lens is held in position by means of the ring 17 that closely engages the body as shown by Figure 1.

In order to insure against movement of the reflector within the body portion of the headlight, cushioning members such as indicated at 18 and 19 are supported between the reflector and inner surface of the body portion. Wires 20 extend through the rear portion of the headlight and connect with the socket 11 to supply the lamp 12 with electric energy from a suitable source of electric supply.

It might be further stated that the headlight is of such a construction, that when properly positioned, the light rays projected from the lamp supported in the body portion will be directed forwardly and downwardly out of the line of vision of approaching motor vehicles, while at the same time the road surface will be adequately illuminated.

I claim:

A headlight including an elongated body portion, spaced flanges disposed throughout the length of the body portion and secured to the inner side walls thereof, a curved reflector having flanges formed along the edges thereof and fitted between the spaced flanges to slidably support the reflector, a lamp housing formed at the inner end of the body portion, upwardly inclined reflecting walls forming a part of the lamp housing to reflect light rays upwardly, and a lamp fitted within the lamp housing.

In testimony that I claim the foregoing as my own, I have hereto affixed my signature.

JOHN R. BETZER.